UNITED STATES PATENT OFFICE.

ALBERT MARCHANT, OF GLOUCESTER, MASSACHUSETTS.

IMPROVEMENT IN LIQUID COMPOSITIONS FOR PRESERVING SEINES, CORDAGE, &c., TO PREVENT MILDEW.

Specification forming part of Letters Patent No. 151,787, dated June 9, 1874; application filed May 13, 1874.

*To all whom it may concern:*

Be it known that I, ALBERT MARCHANT, of Gloucester, of the county of Essex and State of Massachusetts, have invented a new and useful Liquid Composition for Protecting or Preserving Fish-Seines, Ropes, Cloth, or various other fabrics; and I do hereby declare the same, and its ingredients and the mode of compounding them, to be described as follows:

In making the said composition I take eight gallons of tar, (whether from coal or wood,) eight gallons of extract of hemlock-bark, (such as sold in the market for tanning skins,) and eight gallons of a solution of alkali of ten degrees of the ordinary hydrometer used by soap-boilers. The tar and the solution of alkali are first to be mixed together, after which the extract of hemlock-bark is to be added to the mixture. I also add to the mixture about five hundred gallons of water. The whole is to be heated and well stirred, when it will be fit for use.

To use the composition, the article—as a seine, for instance—is to be steeped in it for about twenty-four hours, after which it is to be removed and subjected to the action of the sun and air until it may become sufficiently dried.

I do not confine my invention to the precise proportions of its constituents, as hereinbefore stated, as they may be somewhat varied and still be productive of good results.

The composition, while giving to the seine the desirable color for use, is not liable to cause its folds to adhere together. It will thoroughly protect the seine from decay or mildew.

I claim as my invention—

The composition, substantially as described, for the purpose set forth, consisting of tar and alkali and the extract of bark or tannin, combined or mixed with a suitable quantity of water, all being essentially as explained.

ALBERT MARCHANT.

Witnesses:
R. H. EDDY,
S. N. PIPER.